United States Patent
Peacock

[11] Patent Number: 5,798,037
[45] Date of Patent: Aug. 25, 1998

[54] FILTER ELEMENT HAVING LASER MARKED PLASTIC COMPONENTS

[75] Inventor: George B. Peacock, Chichester, United Kingdom

[73] Assignee: Pall Corporation, East Hills, N.Y.

[21] Appl. No.: 833,257

[22] Filed: Apr. 4, 1997

Related U.S. Application Data

[63] Continuation of Ser. No. 619,247, Mar. 21, 1996, abandoned.

[30] Foreign Application Priority Data

Mar. 21, 1995 [GB] United Kingdom ............ 9505656

[51] Int. Cl.$^6$ ............................................ B01D 27/08
[52] U.S. Cl. ............... 210/85; 210/500.1; 106/635; 106/712; 427/145; 427/514; 427/554
[58] Field of Search ................. 210/85, 94, 232, 210/348, 483, 500.1; 106/190, 635, 712; 427/145, 469, 500, 508, 514, 530, 554

[56] References Cited

U.S. PATENT DOCUMENTS

| | | |
|---|---|---|
| 4,601,820 | 7/1986 | Leason ........................ 210/94 |
| 4,959,406 | 9/1990 | Foltin et al. . |
| 4,986,904 | 1/1991 | Bugar et al. ................ 210/94 |
| 5,053,440 | 10/1991 | Schueler et al. . |
| 5,501,827 | 3/1996 | Deeney et al. . |

FOREIGN PATENT DOCUMENTS

| | | |
|---|---|---|
| 1284125 | 5/1991 | Canada . |
| 0190997 | 8/1986 | European Pat. Off. . |
| A-1045309 | 10/1966 | United Kingdom . |
| 2170504 | 8/1986 | United Kingdom . |
| 2234601 | 2/1991 | United Kingdom . |
| A-2269782 | 2/1994 | United Kingdom . |

*Primary Examiner*—W. L. Walker
*Attorney, Agent, or Firm*—Leydig, Voit & Mayer, Ltd.

[57] ABSTRACT

The filter element comprises a filter medium which is incorporated into an assembly made of plastic components. At least one of the components incorporates titanium dioxide as a filler. The treatment of such a component with a laser produces a dark pigment within the component and thus can be used to form characters on the component to convey information regarding the filter element such as product part number, lot code, serial number or flow arrow.

14 Claims, 2 Drawing Sheets ial. One filter element of this type his a corrugated sheet of filter medium formed into an annulus with a plastic cage around the outside of the annulus and plastic end caps covering the two ends of the filter medium. The end caps allow the filter element to be incorporated into a housing to which fluid is supplied for filtration by the medium and from which filtered fluid is withdrawn.

FILTER ELEMENT HAVING LASER MARKED PLASTIC COMPONENTS

This application is a continuation of patent application Ser. No. 08/619,247, filed Mar. 21, 1996, now abandoned.

BACKGROUND TO THE INVENTION

1. Field of the Invention

The present invention relates to filter elements, an more particularly to methods of marking filter elements.

2. Brief Review of the Related Art

A known type of filter element comprises filter medium incorporated into an assembly made of components of a plastic material. One filter element of this type his a corrugated sheet of filter medium formed into an annulus with a plastic cage around the outside of the annulus and plastic end caps covering the two ends of the filter medium. The end caps allow the filter element to be incorporated into a housing to which fluid is supplied for filtration by the medium and from which filtered fluid is withdrawn.

The plastic components in filters of these kinds are is generally made from polypropylene although other plastic materials can also be used such as polyethylene, polyester, polysulphone or polycarbonates.

It will be appreciated that these filter elements are made in a large number of different types. There are many variations such as size, performance, etc. In addition, it may also be desired to identify each filter element individually and give other manufacturing information directly on the filter element.

It has previously been proposed to mark such information on to plastic components of the filter elements by ink printing or by ink transfer tape or by displacing the plastic materials to form identifying characters (letters and numerals). The displacement has been performed by hot or cold stamping, embossing, vibroetching or pin marking. Since polypropylene is difficult to print on with ink and since inks can introduce contaminants into the filtered fluids the ink printing and ink transfer tape marking method have not been widely used. Rather, the displacement methods have tended to be most widely used on filter elements.

Such displacement methods have, however a number of disadvantages. The characters can be very difficult to read particularly where the plastic components surface is relatively thin (for example 1.5 mm to 2.5 mm thick). There can also be difficulties in reading such characters when the plastics surface is wet, as when the integrity of the filter element is being measured.

Another situation where the characters can be difficult to read, when made by displacement, is when the filter element is within a transparent bag or container. The bag or container may need to be opened to see the characters and, if the filter element is the wrong filter element, it may then have to be discarded. This problem arises particularly in the electronics and pharmaceutical industries where contamination is a potentially big problem.

SUMMARY OF THE INVENTION

According to one aspect of the present invention, there is provided a filter element including a filter medium incorporated in an assembly having at least one plastic material component, the at least one polymeric material component being treated by laser energy to produce markings having a color different from the color of the plastic material.

According to another aspect of the present invention, there is provided a method of marking a filter element including a filter medium incorporated in an assembly having at least one plastic material component, comprising treating the plastic material component using laser energy to produce makings having a color different from the color of the plastic material.

Preferably titanium dioxide is introduced into the plastic material component and the marking produced using a laser beam to treat the plastic material incorporating the titanium dioxide.

It has been found that marking a filter element in this way produces characters that can be easily read under substantially all circumstances. Where titanium dioxide is used, it has been shown that it does not introduce any contamination into the filtered fluids.

Exemplary embodiments of a method for marking filter elements in accordance with the present invention is described with reference to the accompanying drawings in which:

DESCRIPTION OF THE PREFERRED EMBODIMENT

Figure 1:
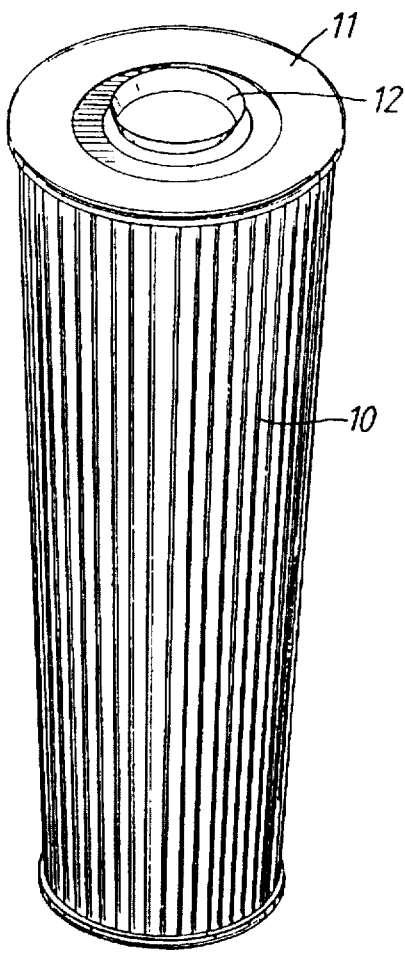
FIG. 1 is a view of a filter element.

Referring to FIG. 1, there is illustrated a filter element which comprises a corrugated sheet of filter medium 10 formed into an annulus. The filter medium may be formed from any suitable material such as paper, fibers or plastic materials such as nylon. The ends of the filter medium 10 are covered be disc-like end caps 11 made any suitable material such as a polymeric material including plastics. This plastic material may be polypropylene, polyethylene, polyester, polysulphone, a polycarbonate, or any other suitable plastic material. The end cap 11 is connected to the filter medium 10 by any known method such as gluing or by insertion of the filter medium 10 into an end cap 11 when the end cap is molten.

Each end cap 11 includes a central aperture 12 to allow the filter element to be located in a housing. In use, fluid to be filtered is supplied to the housing and passes through the filter medium 10, generally from the outer surface of the filter medium 10 to the inner surface of the filter medium 10, from where it is extracted from the housing through one of the apertures 12 in one of the end caps 11.

Figure 2:
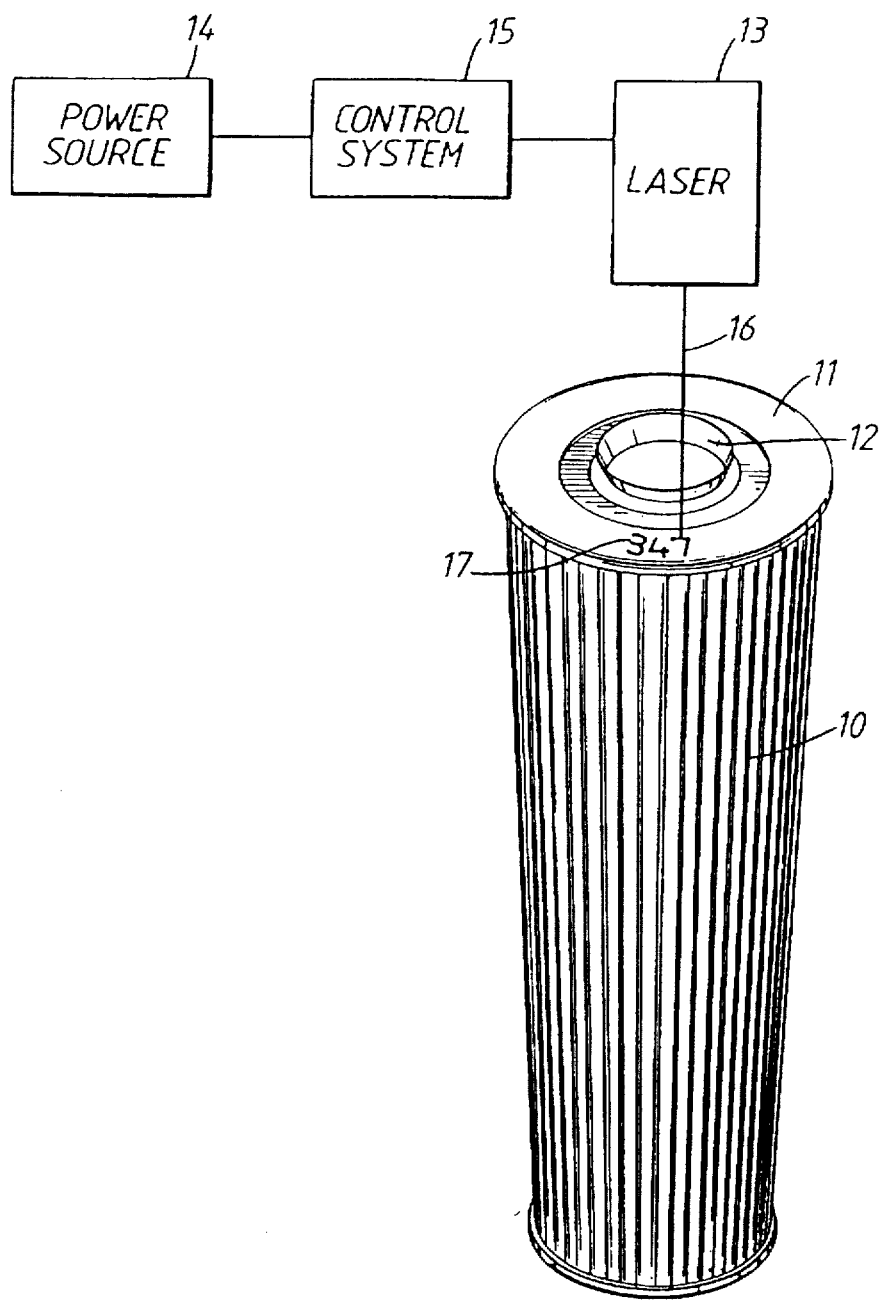
FIG. 2 is a similar view to FIG. 1 with the addition of a laser marking system.

At least one of the end caps 11 contains a titanium dioxide filler which may be present in an amount of 0.25 to 3.0% by weight and is preferably present in an amount of 1.0% by weight. Referring next to FIG. 2, a laser 13 is then used to mark the end cap 11 containing the titanium dioxide filler. An example of a suitable laser 13 is an Nd-YAG solid state laser with a wavelength of 1064 Nm and a power of 150 W. The laser 13 is powered by a power source 14 and controlled by a control system 15. The exposure of the titanium dioxide to the laser beam 16 produces a dark pigment in the plastic material containing the titanium dioxide. Thus the color of the treated area is different from the color of the untreated plastic material. This can be used to create characters 17 conveying information regarding the filter element such as the product part number, product manufacturing lot code, the serial number of the individual filter element, an arrow indicating the direction of flow and any other relevant information. The characters may be letters or numbers or any other character (such as symbols).

It has been found that the introduction of titanium dioxide into the plastic material of the end cap 11 does not produce any increase in the level of extractables from the filter element when in use. The presence of the titanium dioxide has no adverse effect on the performance of the en caps 11. The characters produced can be easily read even when the plastic material of the end caps 11 is relatively thin or when it is wet. The characters 17 can also be read readily through a transparent wrap.

It will be appreciated that the filter element described above is by way of example only. The characters can be produced on any filter element including a filter medium which is incorporated into an assembly made of suitable plastic components. For example, the filter element described above with reference to the drawing could include an outer plastic cage and an inner support core. The filter medium need not be provided with end caps; it could be incorporated in a plastic housing, with the part of the plastic housing including the titanium dioxide and being marked with the laser.

Titanium dioxide need not be used. As an Alternative any material may be introduced into the plastic material that produces a color change when treated with a laser.

Another possibility, with at least certain plastic materials, is to omit the filler and simply change the plastic material itself to produce a color change. This might be done with a laser by carbonising the material.

What is claimed is:

1. A filter element including a filter medium incorporated in an assembly having at least one plastic component, the at least one plastic component having a first portion comprising a material which chances color when exposed to laser energy to produce markings having a color different from the color of the at least one plastic component.

2. The filter element according to claim 1, wherein the at least one plastic component comprises at least one of an and cap, an outer cage, an inner support core, and a housing.

3. The filter element according to claim 1, wherein the material in the at least one plastic component comprises titanium dioxide.

4. The filter element acccording to claim 1 wherein the plastics component is of polypropylene or polyetheylene or polyester or polysulphone or a polycarbonate.

5. The filter element according to claim 1 wherein the plastic component comprises at least one of polypropylene, polyethylene, polyester, polysulphone and a polycarbonate.

6. The filter element according to claim 1 wherein the markings comprise characters including at least one of letters and numerals.

7. A method of marking a filter element including a filter medium incorporated in an assembly having at least one plastic component comprising the steps of incorporating a material into a first portion of the at least one plastic component and treating the at least one plastic component with laser energy to produce markings at the material having a color different from the color of the plastic component.

8. The method according to claim 7, wherein the at least one plastic component comprises at least one of an end cap, an outer cage, an inner support core, and a housing.

9. The method according to claim 7, wherein the step of incorporating a material comprises incorporating titanium dioxide into the at least one plastic component and then exposing the plastic component to a beam from a laser to produce the marking.

10. The method according to claim 9 comprising incorporating the titanium dioxide in an amount of from 0.25% to 3.0% by weight.

11. The method according to claim 9 comprising controlling the laser beam to produce characters such as letters and numerals.

12. The method according to claim 9 comprising forming the plastic component from at least one of polypropylene, polyethylene, polyester, polysulphone and polycarbonate.

13. The filter element according to claim 3 wherein the titanium dioxide is present in an amount of 1% by weight.

14. The method according to claim 9 comprising incorporating the titanium dioxide in an amount of 1.0% by weight.

* * * * *

UNITED STATES PATENT AND TRADEMARK OFFICE
CERTIFICATE OF CORRECTION

PATENT NO. : 5,798,037
DATED : August 25, 1998
INVENTOR(S) : George B. Peacock

It is certified that error appears in the above-identified patent and that said Letters Patent is hereby corrected as shown below:

Column 3, Line 32, change "chances" to --changes--;

Line 36, change "and" to --end--;

Column 4, Lines 2 and 3, delete entirely and replace with

--titanium dioxide is present in an amount from 0.25% to 3% by weight.--;

Signed and Sealed this

First Day of December, 1998

BRUCE LEHMAN

Attest:

Attesting Officer

Commissioner of Patents and Trademarks